(12) United States Patent
Champion et al.

(10) Patent No.: US 7,599,109 B2
(45) Date of Patent: Oct. 6, 2009

(54) SECURITY DEVICE

(75) Inventors: David A. Champion, Lebanon, OR (US); Chinmay Suresh Betrabet, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 11/652,706

(22) Filed: Jan. 12, 2007

(65) Prior Publication Data

US 2008/0170287 A1 Jul. 17, 2008

(51) Int. Cl.
*G02F 1/153* (2006.01)
*G02F 1/15* (2006.01)

(52) U.S. Cl. .................. 359/275; 359/265; 359/273

(58) Field of Classification Search ......... 359/265–269, 359/271–275, 493, 601–604; 345/84, 85, 345/105, 108, 111
See application file for complete search history.

(56) References Cited

U.S. PATENT DOCUMENTS

| | | | | |
|---|---|---|---|---|
| 5,668,663 | A * | 9/1997 | Varaprasad et al. | 359/608 |
| 6,471,360 | B2 * | 10/2002 | Rukavina et al. | 359/609 |
| 6,753,995 | B2 * | 6/2004 | Wang | 359/271 |
| 6,963,437 | B2 * | 11/2005 | Bauer et al. | 359/245 |
| 7,130,101 | B2 | 10/2006 | Rukavina et al. | |
| 7,317,567 | B2 * | 1/2008 | Campbell | 359/265 |
| 7,494,231 | B2 * | 2/2009 | Varaprasad et al. | 359/603 |
| 2007/0139756 | A1 * | 6/2007 | Agrawal et al. | 359/265 |

* cited by examiner

*Primary Examiner*—Loha Ben

(57) ABSTRACT

Embodiments of a security device utilizing electrochromic material are disclosed.

21 Claims, 1 Drawing Sheet

SECURITY DEVICE

BACKGROUND

Security devices, such as security tags, may be used to identify a valid or an invalid user or condition. It may be desirable to provide a security tag that flashes or otherwise provides a highly visible security indication.

DETAILED DESCRIPTION OF THE DRAWINGS

Figure 1:
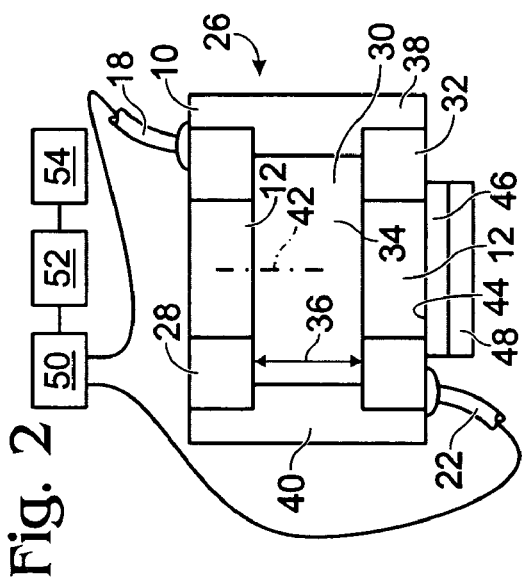
FIG. 1 is an isometric view of one example embodiment of a security device.

FIG. 1 shows one example embodiment of a security device 10 including a security window 12 through which a visible security indication may be visible when the device is in an activated condition. Window 12 may be manufactured of any transparent material, such as glass or plastic. Security device 10 may be manufactured in a variety of different forms, including a tag that may be secured with adhesive to a shipping container as shown, a tag including a clasp that may be attached to a handle of a suitcase or a laptop computer (not shown), or a personal identification card worn on an individual (not shown), for example. Device 10 may have a width 14 of approximately two inches and a height 16 of approximately one and a half inches. Of course, device 10 may be manufactured in any size or shape as is desired for a particular application. Device 10 may include a first electrode lead 18 connected to a top surface 20 and a second electrode lead 22 connected to a bottom surface 24. The first and second electrode leads 18 and 22 may be utilized to provide a potential difference across security device 10 to provide a visible security indication, as will be described below.

Figure 2:
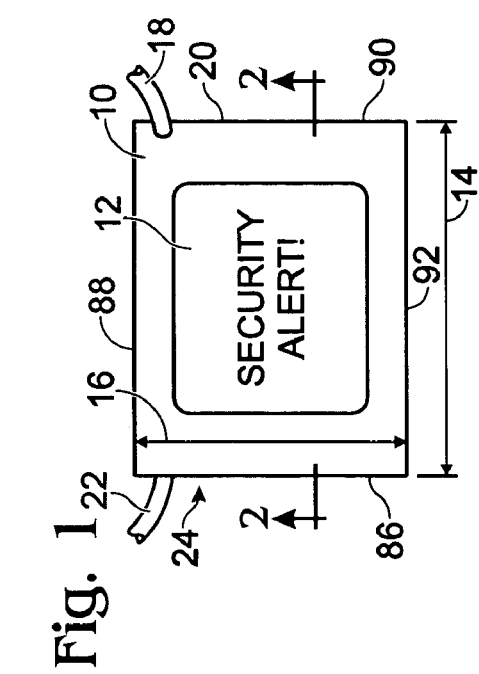
FIG. 2 is a side cross sectional view of the security device of FIG. 1.

FIG. 2 shows a cross sectional view of security device 10 taken along line 2-2 of FIG. 1. Security device 10 includes a stacked or sandwiched layered system 26 including a first electrode 28, a second electrode 32 and an electrochromic material 30 sandwiched therebetween. First and second electrode leads 18 and 22, respectively, may be secured to first and second electrodes 28 and 32, respectively, by any appropriate method, such as soldering as shown, clasps (not shown), conductive adhesive (not shown), or the like. First and second electrodes 28 and 32 may be manufactured of a conductive material, and in the embodiment shown, are manufactured of indium doped tin oxide (ITO). The electrodes may define a gap 34 therebetween in which electrochromic material 30 is positioned. In the example embodiment shown, gap 34 has a thickness 36 of approximately 50 micrometers.

Gap 34 may be enclosed by end caps 38 and 40 which may seal electrochromic material 30 within gap 34 and between first and second electrodes 28 and 32. End caps 38 and 40 may be manufactured of a nonconductive material, such as an adhesive. In the embodiment shown, end caps 38 and 40 may extend inwardly into gap 34 and define thickness 36 of gap 34. In another embodiment, end caps 38 and 40 may not extend into gap 34 and may not define the thickness of gap 34. In such an embodiment, electrochromic material positioned within gap 34 may include spacers (not shown) positioned therein, such as silica or polystyrene spheres, for example, wherein the width or diameter of the spacers may define the thickness 36 of gap 34.

In the embodiment shown, first electrode 28 and second electrode 32 each include a window 12 therein, in a central region of the electrodes. In another embodiment, a window 12 may be positioned in only one of first electrode 28 or second electrode 32. In another embodiment, window 12 may comprise the entirety of an electrode 28 or 32. In other embodiments, window 12 may be shaped, sized or positioned differently than shown. Windows 12 in first and second electrodes 28 and 32 may be aligned with one another along a viewing axis 42 and may be positioned over a permanent visible security indication 44, such as the written wording "SECURITY ALERT" positioned on a substrate 46. Of course, in other embodiments, any wording, logo or combination thereof, such as the wording "AUTHORIZATION TIME EXPIRED," "PRODUCT TEMPERATURE CONDITIONS EXCEEDED," "AUTHENTIC HP MANUFACTURED PRODUCT," or "PRODUCT MANUFACTURED ON XX/XX/XXX," may be positioned on substrate 46. Accordingly, when electrochromic material 34 is in a transparent or semi-transparent state, security indication 44 may be visible through windows 12. When electrochromic material 30 is in an opaque or semi-opaque state, security indication 44 may not be visible, or may only partially be visible through windows 12. In another embodiment, window 12 may be positioned in first electrode 28 and second electrode 32 may be patterned with words or a logo such that the words or logo are visible to the naked eye when electrochromic material 30 is in a transparent state but are not visible to the naked eye when electrochromic material 30 is in an opaque state. In still another embodiment, different parts of an electrode, such as different regions of second electrode 32, for example, different quadrants of second electrode 32, may be individually activated to provide the desired visible security indication in different regions of device 10, such as different quadrants of second electrode 32, when security device 10 is in an activated or partially activated condition.

Substrate 46 may be manufactured of any suitable material, and may be manufactured of, for example, glass or plastic. Substrate 46 may be secured to an adhesive 48, such as double stick foam tape, such that adhesive 48 may be used to secure device 10 to a product or shipping container (not shown) or a personal identification badge (not shown).

Still referring to FIG. 2, first and second electrode leads 18 and 22 may be connected to a potential source 50, such as a battery or a photovoltaic device, that may provide a potential difference between first and second electrode leads 18 and 22 and, therefore, may provide a potential difference between first and second electrodes 28 and 32, respectively. Potential source 50 may be connected to a controller 52, such as a computer device, that may control potential source 50. Controller 52 may control the potential difference created by potential source 50 across first and second electrodes 28 and 32 such that first and second electrodes 28 and 32 experience a potential difference. In several different examples the potential difference may be, for example, two volts, six volts, or ten volts. Controller 52 may include or may be connected to a timer device 54 that may time the potential differences applied to first and second electrodes 28 and 32. For example, timer device 54 may indicate to controller 52 when a predetermined time has expired, or may allow controller 52 to rapidly sequence device 10 between active and inactive conditions, such as in a blinking or a flashing operation.

Electrochromic material 30 may be manufactured of any suitable material that changes its absorbance upon the application of a potential difference. In one example embodiment, electrochromic material 30 may be manufactured of Bayer® BHE 4560. The electrochromic material 30 may be suspended in a solvent manufactured of, for example, a polar aprotic solvent, such as liquid propylenecarbonate, acetone, dimethylsulfoxide, methylethylketone, tetrahydrofuran, ethylacetate, acetonitrile, and dimethylformamide. In particular, the specific example mixtures were manufactured. Example one: 0.01M in propylene carbonate: 0.312 grams (gm) BHE 4560, 25 milliliters (ml) propylene carbonate (anhydrous). The mixture was heated up to 80 degrees Celsius with constant stirring. Example two: 0.02M in propylene carbonate: 0.625 gm BHE 4560, 25 ml propylene carbonate (anhydrous). Example three: 0.01M in propylene carbonate: 0.1 gm poly methylmethacrylate (Mw 120K), 0.312 gm BHE 4560, 25 ml propylene carbonate (anhydrous).

Figure 3:
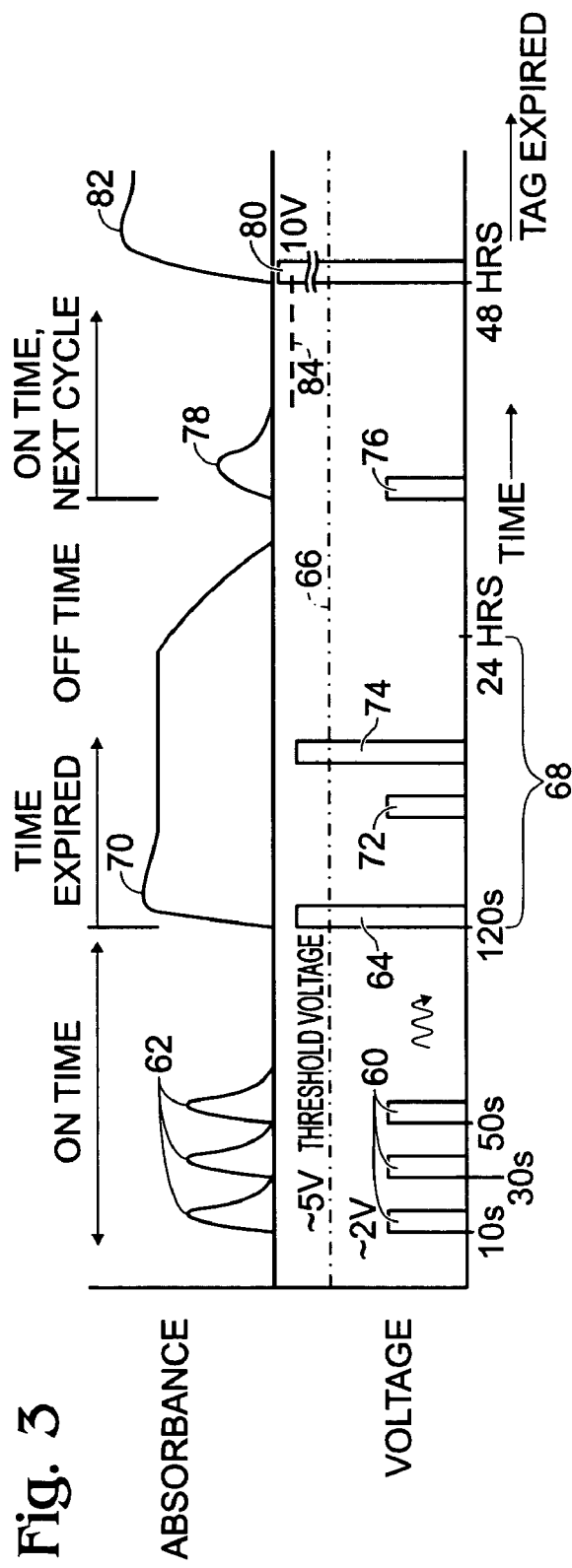
FIG. 3 is a graph showing activated and non-activated time periods of one example embodiment of a security device.

FIG. 3 shows operation of security device 10. Controller 52 may control potential source 50 to apply a two volt potential difference across first and second electrodes 28 and 32 for sixty seconds. Timer device 54 may cause the potential difference across first and second electrodes to alternate between zero volts and two volts every ten seconds, which may cause electrochromic material 30 to move from an inactive condition for ten seconds to an active condition for ten seconds, wherein this cycle is repeated two more times. Such an operation will result in three two-volt peaks 60 during the active condition, wherein each peak corresponds to an absorbance peak 62. The three peaks 62 of absorbance of electrochromic material 30 will result in the electrochromic material having a blue color and being opaque during the time period of absorbance peak 62, namely, ten seconds. Between the voltage peaks 60, and therefore, between the absorbance peaks 62, electrochromic material 30 in the inactive condition will have a clear color and will be transparent. During this inactive, transparent condition security indication 44 will be visible through window 12. Movement of the electrochromic material back and forth between the activated condition and the unactivated condition may result in a visible blinking of security device 10 every ten seconds. Accordingly, application of two volt potential 60 will activate electrochromic material 30, wherein the electrochromic material 30 will return to its inactive state immediately after removal of two volt potential 60.

Still referring to FIG. 3, in one example embodiment, at approximately 120 seconds, controller 52 may control potential source 50 to apply a seven volt potential difference 64 across first and second electrodes 28 and 32. Seven volt potential difference 64 is higher than a five volt threshold voltage 66 of device 10, wherein threshold voltage 66 is defined as a voltage threshold above which device 10 is activated at an absorbance 70 for a predetermined time period 68 regardless of the below-termination voltage condition applied or withdrawn during such predetermined time period. In other words, once the threshold voltage 66 of device 10 is exceeded, electrochromic material 30 will be activated for the predetermined time period 68 even if the voltage potential is removed during the predetermined time period. Accordingly, after electrochromic material 30 is subjected to a potential difference above threshold voltage 66, but below termination voltage 84, electrochromic material 30 will move to the active condition and will remain activated for the predetermined time period 68. Removal of the voltage during the predetermined time period 68 will not result in electrochromic material 30 returning to the inactive condition. Accordingly, removal of potential difference 64 across electrodes 28 and 32 and thereafter, application of a two volt voltage potential 72 and application of an eight volt voltage potential 74 does not change the condition of electrochromic material 30 during predetermined time period 68. In the example shown, threshold voltage 66 is five volts and predetermined time period 68 is twenty four hours. Of course, in other embodiments, device 10 may define other threshold voltage levels 66 and other predetermined time periods 68. Device 10 may be referred to as temporarily irreversible during such predetermined time periods.

Still referring to FIG. 3, after electrochromic material 30 has experienced predetermined time period 68, the device returns to the inactive state wherein a voltage potential 76 of two volts, for example, applied across first and second electrodes 28 and 32 will result in an absorbance peak 78 during the time potential difference 76 is applied. When potential difference 76 is removed, the absorbance peak 78 is also removed and electrochromic material 30 returns to the transparent, inactive condition.

In one example embodiment, during a potential difference of zero volt the percent transmission is 7.36 (at 400 nanometers), resulting in a clear, transparent electrochromic material. After application of two volts, the percent transmission is 0.13, resulting in a blue, opaque electrochromic material. After returning to zero volt the percent transmission is 6.53 percent, resulting in a clear, transparent electrochromic material. After another application of two volts, the percent transmission is 0.173, resulting in a blue, opaque electrochromic material. After returning again to zero volt the percent transmission is 6.62 percent, resulting in a clear, transparent electrochromic material. After application of five volts, which is equal to the threshold voltage 66 of device 10, the percent transmission is 0.033, resulting in a blue, opaque electrochromic material. After returning again to zero volt the percent transmission remains at 0.039 percent, resulting in a blue, opaque electrochromic material during the predetermined time period 68, even though the applied potential difference was reduced to zero volt.

It is believed that the method of temporary irreversibility of electrochromic material 30 functions as follows. The excess voltage applied, i.e., the voltage 64 applied above the threshold voltage level 66, may have two effects. First, voltage 64 may lead to storing of an excess charge in the electrodes that may compensate for the charge leakage after the potential 64 applied to the electrodes is removed or switched off (i.e., the electrochromic material 30 remains blue in color). Second, voltage 64 may also degrade a significant fraction of the active material 30 irreversibly, which may manifest itself as a lower absorbance, i.e., higher transmittance, in the next cycle. It is believed that as the spike voltage 64 magnitude is increased, the fraction of the permanently degraded electrochromic material 30 is also increased.

Device 10 may also be permanently moved to either the active or the inactive condition. In one such embodiment, timer device 54 (FIG. 2) may be utilized to terminate the life of device 10. For example, after a predetermined time or date, for example, forty eight hours after a security badge has been issued, timer device 54 may communicate the termination date or time to controller 52. Controller 52 may then control potential device 50 to apply a termination potential difference 80, of ten volts for example, across first and second electrodes 28 and 32. The termination potential difference 80 may be a potential difference that is higher than a termination potential level 84, and which produces an absorbance peak 82. Application of a potential difference 80 higher than termination potential level 84 may move the electrochromic material to a permanent active condition wherein the condition of the electrochromic material is unchanged regardless of a potential, or lack thereof, applied thereafter across first and second electrodes 28 and 32.

Referring again to FIGS. 1 and 2, one example embodiment of the manufacture of security device 10 will now be described. In one embodiment, first electrode 28 is secured to substrate 46 and to adhesive 48. Second electrode 32 is then secured to first electrode 28 around three sides 86, 88 and 90. Adhesive 38 and 40 may be utilized which may define a thickness 36 of gap 34. First and/or second electrodes 28 and 32 may include windows 12 positioned therein. Electrochromic material 30, suspended in a solvent, for example, may then be positioned within gap 34 using a vacuum fill process. Fourth edge 92 of device 10 may then be sealed by adhesive 38 or 40. First and second electrode leads 18 and 22 may then be secured to first and second electrodes, respectively, by soldering to provide a conductive connection to the electrodes. Electrode leads 18 and 22 may then be connected to potential source 50, controller 52 and timer device 54. First and second electrodes may have a thickness of approximately 20 microns and gap 34 may have a thickness of approximately 50 microns.

In one example embodiment, security device 10 may be electronically connected to a radio frequency identification (RFID) tag so that if the security device 10 experiences a condition out of an acceptable range, as detected by the RFID tag, security device 10 may be moved to an activated condition. For example, during shipping of a container (not shown) to which security device 10 is secured, the container may experience a temperature below an acceptable threshold level. The attached RFID tag may activate a security device 10 having a security indication 44 of "TEMPERATURE CONDITIONS EXCEEDED." Accordingly, upon reaching the shipping destination, the container will bear security device 10 that provides a visible security alarm or indication.

Other variations and modifications of the concepts described herein may be utilized and fall within the scope of the claims below.

We claim:

1. A security device, comprising:
   a first electrode member;
   a second electrode member including a transparent security display region; and
   an electrochromic material positioned between said first electrode member and said second electrode member in said transparent security display region.

2. The device of claim 1 wherein said electrochromic material is activated from an unactivated condition to an activated condition upon a change in potential applied between said first and second electrode members.

3. The device of claim 2 wherein said electrochromic material provides a visible security display in said security display region in said activated condition.

4. The device of claim 3 wherein said electrochromic material provides an absence of a visible security display in said security display region in said unactivated condition.

5. The device of claim 2 wherein said electrochromic material is activated to and remains in an activated condition for a first length of time when said change in potential applied is greater than a threshold level and wherein said electrochromic material is activated to and remains in an activated condition for a second length of time when said change in potential applied is less than the threshold level, wherein said first length of time is greater than said second length of time.

6. The device of claim 5 wherein said first length of time is at least twenty four hours and wherein said second length of time is less than ten minutes.

7. The device of claim 5 wherein said threshold level defines a potential that retains said electrochromic material in said activated condition for a temporary time period regardless of a potential applied to said electrochromic material during said temporary time period.

8. The device of claim 2 further comprising a timing device connected to said first and second electrode members, wherein said timing device controls activation of said electrochromic material such that said electrochromic material flashes a visible light in said activated condition when said timing device controls said first and second electrode members.

9. The device of claim 8 further comprising a potential source that activates said electrochromic material to an irreversibly opaque condition when said timing device reaches the end of a timed period.

10. The device of claim 1 further comprising an adhesive positioned on said second electrode member to secure said security device to a secured article.

11. The device of claim 1 further comprising a potential source connected to said first and second electrode members that provides a change in potential to move said electrochromic material between said activated and unactivated conditions.

12. The device of claim 1 further comprising a control system that controls said potential source.

13. The device of claim 1 wherein said electrochromic material is dissolved in a solvent positioned between said first electrode member and said second electrode member in said transparent security display region.

14. The device of claim 12 wherein said control system is a radio frequency control device that allows control of said device from a location remote from the device.

15. A method of using a security device, comprising:
    generating a potential difference between a first electrode and a second electrode of a security device, said second electrode including a transparent region;
    said potential difference moving an electrochromic material positioned between said first and second electrodes from an unactivated condition to an activated condition; and
    said electrochromic material in said activated condition generating a visible security indication through said transparent region of said second electrode.

16. The method of claim 15 wherein said step of generating a potential difference comprises generating a potential difference greater than a threshold value such that said electrochromic material is irreversibly moved to said activated condition during a predetermined time period.

17. The method of claim 15 wherein said step of generating a potential difference comprises generating a potential difference less than a threshold value such that said electrochromic material is moved to said activated condition only while said potential difference is being generated.

18. The method of claim 15 further comprising:
    removing said potential difference;
    said removing said potential difference moving said electrochromic material from said activated condition to said unactivated condition; and
    wherein said electrochromic material in said unactivated condition generates an absence of a visible security indication through said transparent region of said second electrode.

19. The method of claim 15 further comprising generating an expiration potential difference between said first electrode and said second electrode that irreversibly moves said electrochromic material to an expiration condition.

20. A method of making a security tag, comprising:
    forming a layered structure including a first electrode, a second electrode including a transparent security display region, and an electrochromic material positioned between said first and second electrodes.

21. The method of claim 20 further comprising connecting said first and said second electrodes to a potential source adapted for applying a potential difference between said first and said second electrodes to change said electrochromic material to a visible security alarm condition wherein a security message is visible to the naked human eye in said security display region.

* * * * *

UNITED STATES PATENT AND TRADEMARK OFFICE
CERTIFICATE OF CORRECTION

PATENT NO. : 7,599,109 B2  Page 1 of 1
APPLICATION NO. : 11/652706
DATED : October 6, 2009
INVENTOR(S) : Champion et al.

It is certified that error appears in the above-identified patent and that said Letters Patent is hereby corrected as shown below:

In column 5, line 64, in Claim 9, delete "timed" and insert -- time --, therefor.

Signed and Sealed this

Twenty-sixth Day of January, 2010

David J. Kappos
*Director of the United States Patent and Trademark Office*